United States Patent
Blanding et al.

(10) Patent No.: US 7,612,956 B2
(45) Date of Patent: Nov. 3, 2009

(54) OPTICAL MOUNT PIVOTABLE ABOUT A SINGLE POINT

(75) Inventors: Douglass L Blanding, Painted Post, NY (US); John H Bruning, Pittsford, NY (US); Jack W Frankovich, Fairport, NY (US); Keith E Hanford, Macedon, NY (US); Kevin J Magierski, Victor, NY (US); Mark C Sanson, Macedon, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/072,656

(22) Filed: Feb. 27, 2008

(65) Prior Publication Data
US 2008/0204908 A1    Aug. 28, 2008

Related U.S. Application Data

(60) Provisional application No. 60/903,991, filed on Feb. 28, 2007.

(51) Int. Cl.
*G02B 7/02* (2006.01)
(52) U.S. Cl. .................................... 359/823; 359/827
(58) Field of Classification Search ............ 359/823
See application file for complete search history.

(56) References Cited

U.S. PATENT DOCUMENTS

| | | | |
|---|---|---|---|
| 5,428,482 A | 6/1995 | Bruning et al. | 359/827 |
| 5,986,827 A | 11/1999 | Hale | 359/822 |
| 6,191,898 B1 | 2/2001 | Trunz et al. | 359/819 |
| 6,259,571 B1 | 7/2001 | Holderer et al. | |
| 6,271,976 B1 | 8/2001 | Weber | 359/819 |
| 6,538,829 B2 | 3/2003 | Rau et al. | 359/819 |
| 6,873,478 B2 | 3/2005 | Watson | 359/819 |
| 6,906,848 B2 * | 6/2005 | Aubuchon | 359/291 |
| 2006/0139775 A1 | 6/2006 | Shibazaki | |

FOREIGN PATENT DOCUMENTS

JP    2000-235134    8/2000

* cited by examiner

*Primary Examiner*—Jordan M. Schwartz
*Assistant Examiner*—James C Jones
(74) *Attorney, Agent, or Firm*—Timothy M. Schaeberle

(57) ABSTRACT

An optical element mount has an outer member and an inner member. The inner member has a central axis and is suspended within the outer member by a plurality of fold flexures. Each fold flexure has a fold that lies along a line that intersects the central axis at one common point, where the common point serves as a pivot point for rotational movement of the inner member.

18 Claims, 7 Drawing Sheets

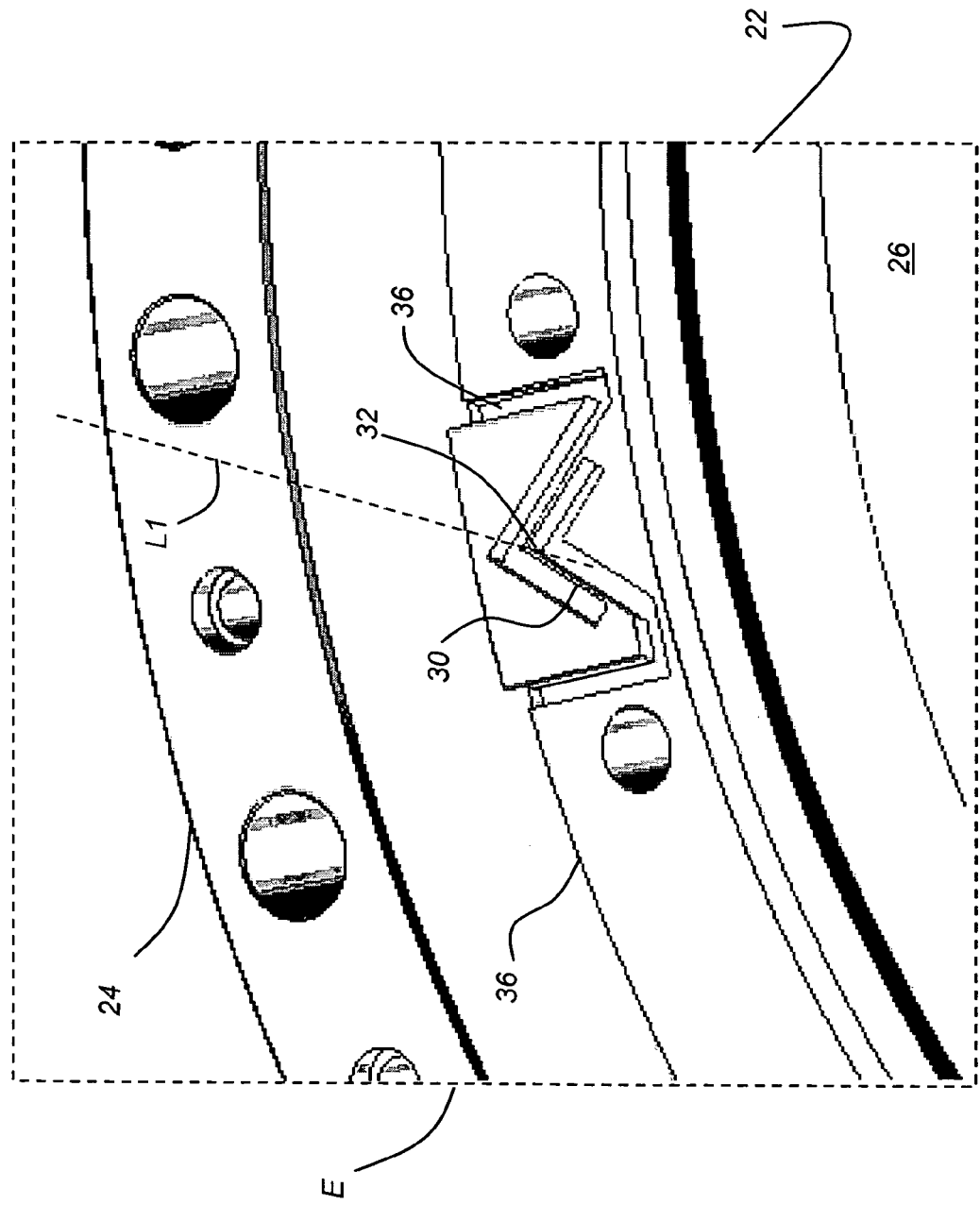

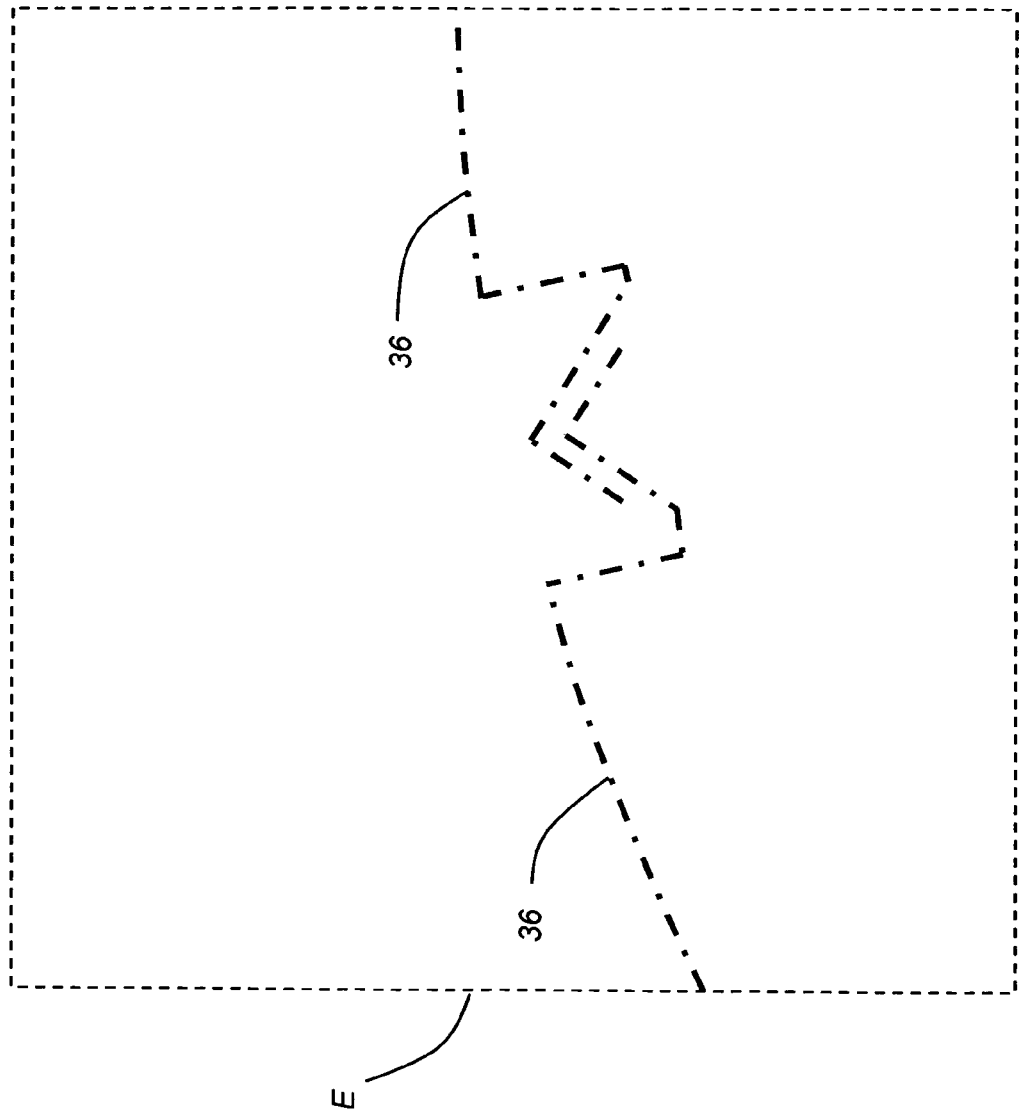

OPTICAL MOUNT PIVOTABLE ABOUT A SINGLE POINT

CROSS REFERENCE TO RELATED APPLICATIONS

This application claims the benefit of U.S. Provisional Application Ser. No. 60/903,991 filed Feb. 28, 2007, entitled "Monolithic Optical Mount" by Blanding et al.

FIELD

This invention generally relates to component mounting and more particularly relates to a mount for an optical element that allows a controlled amount of rotation, about the optical axis and about axes orthogonal to the optical axis, and constrains other movement impurities.

BACKGROUND

Photolithography or microlithography apparatus are widely used in the fabrication of microelectronic semiconductor devices and other microdevices. In photolithography, an optical system directs light energy to record a pattern at high resolution and with precise registration onto a photosensitive layer formed on a silicon wafer or other substrate. Continuing improvements in miniaturization place increasingly more challenging demands on the performance and accuracy of the optical system used for this function. Microlithography optical systems are fairly large and complex, containing a number of optical elements.

Lens assemblies used for microlithography, typically known as "stepper lenses", typically comprise many lens elements, with each element accurately mounted in a cylindrical "cell" made of stainless steel or other stable material. Each of these cells can be precision-machined to extremely tight tolerances, with faces ground flat and parallel, for example, so that when the lens is assembled, each successive cell is fastened to the face of the adjacent cell. This type of arrangement generally allows only very limited adjustment, such as a small amount of tilt or centering motion in X and Y, for example. Once all the cells have been assembled, the entire lens is tested and any unwanted aberrations or image defects are identified. One stacked annuli lens assembly arrangement that is used for this type of optical apparatus is described, for example, in U.S. Pat. No. 5,428,482 entitled "Decoupled Mount for Optical Element and Stacked Annuli Assembly" to Bruning et al.

Final assembly of these lenses can be a time-consuming process, requiring iterations of testing and adjustment until proper performance levels are achieved. Some adjustments may require that a newly assembled lens be disassembled so that one or more components can be modified, then reassembled. Often, after such a complex lens assembly has been completely reassembled, it is then determined that one or more of the lens elements may need to be tilted or decentered slightly in order to correct other measurable optical defects. Some of the adjustments to correct for these defects would be best done with the lens assembled. It would be advantageous to provide a mounting mechanism that allows a degree of fine tuning of lens element positioning without requiring complete disassembly of system components. In designing a complex microlithography lens assembly, it is desirable to allow a measure of adjustability to specified lens elements so that particular defects can be corrected without introducing others. Specific defects or aberrations can be adjusted in a relatively "orthogonal" way if it is possible to make very fine tip and tilt adjustments to lens elements at one or more predetermined locations along the optical axis of the lens assembly, without requiring disassembly of the lens stack.

The task of compensating for aberrations in a complex microlithography assembly or other complex lens system can require significant time and resources and requires an initial detailed assessment of optical aberrations. Potential points of adjustment in the optical system can be identified based on an analysis of wavefront errors including, but not limited to, spherical aberration, coma, and astigmatism and of image placement errors, such as tangential; trapezoidal, and radial distortion and magnification error. As part of this assessment, adjustments that are likely to result in "crosstalk" effects between aberrations must be identified, so that in correcting one aberration, side effects that cause or increase other aberrations can be identified and minimized.

The sequence in which aberrations are compensated is highly significant. For example, in typical practice, after asymmetrical errors are first corrected to within reasonable tolerances, symmetrical errors are then compensated. Subsequent procedure then provides further correction for asymmetric errors. Repeated iterations may be necessary. To help minimize crosstalk between different aberration types, the orthogonality of different aberrations must be quantified in some way. By way of example, an assessment may determine that compensation by tilting a specific lens element may alleviate asymmetric coma and have very little effect on asymmetric astigmatism or tangential distortion. However, this same tilt may have a pronounced effect on trapezoidal distortion. Other adjustments in the system may have similar impact on other aberrations, where there is little effect in some cases or significant effects in others. For this reason, a systematic method is used for carrying out the sequence of adjustments that are needed for a specific lens assembly design. To reduce the likelihood of controlled correction without introducing errors, it is required that adjustments in this series be made without the need for disassembling and reassembling the lens.

There have been a number of solutions proposed for addressing the problems of tilt, tip, and various types of decentering adjustments. Some of these solutions require complex mechanical assemblies having many small parts, such as that shown in U.S. Pat. No. 5,986,827 entitled "Precision Tip-Tilt-Piston Actuator that Provides Exact Constraint" to Hale. Other solutions, such as that proposed in U.S. Pat. No. 6,271,976 entitled "Apparatus for Tilting an Object About at Least One Axis, In Particular an Optical Element" to Weber, provide arrangements of constraints that kinematically define two orthogonal axes of rotation along with adjustable constraints for setting the tilt angle or tilt and tip angles.

Although such conventional approaches can achieve some measure of control over tilt and tip adjustment, however, they fall short of what is needed for high-resolution microlithography. Complex mechanical assemblies can be costly to manufacture and use, can be subject to thermal expansion effects, and can introduce unwanted motion "impurities" that limit their precision and accuracy. Constraint arrangements must be carefully designed and assembled in order to prevent overconstraint in any direction. There is thus a need for an improved optical element mount that allows fine tuning of lens element tilt and tip position and decentration after assembly without the requirement for taking the lens assembly apart.

SUMMARY

It is an object of the present invention to advance the art of optical component mounting, particularly for applications requiring a high level of precision, such as microlithography. With this object in mind, the present invention provides an optical element mount comprising:

an outer member and an inner member wherein the inner member has a central axis and is suspended within the outer member by a plurality of fold flexures, wherein each fold flexure has a fold that lies along a line that intersects the central axis at one common point, wherein the common point serves as a pivot point for rotational movement of the inner member.

It is a feature of the present invention that it provides a mount suitable for monolithic construction using folded sheet flexures.

It is an advantage of the present invention that it constrains motion of a lens or other optical component to tilt and tip rotation on axes that are orthogonal to the optical axis and allows some centration adjustment, while allowing some rotation about the optical axis.

BRIEF DESCRIPTION OF THE DRAWINGS

FIG. 6A is an enlarged view of a fold flexure from the embodiment of FIG. 5.

FIG. 6B is a schematic view tracing center lines of the cavities that define the fold flexure shown in FIG. 6A.

DETAILED DESCRIPTION

Figure 1:
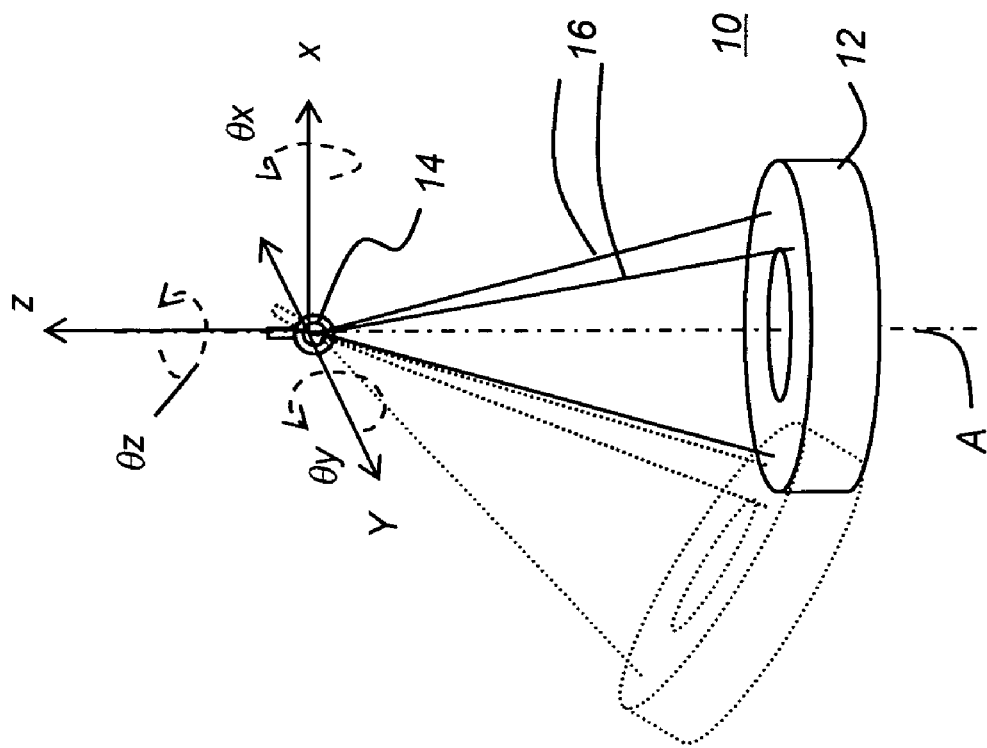
FIG. 1 is a perspective view of a familiar playground device that is useful for illustrating kinetic constraint principles.

In the context of the present disclosure, terms "top" and "bottom" are relative and do not indicate any necessary orientation of a surface, but may be used simply to refer to and distinguish opposite surfaces for a component or block of material.

Figures shown and described herein are provided in order to illustrate key principles of operation and fabrication for lens mount devices according to the present invention and are not drawn with intent to show actual size or scale. Some exaggeration may be necessary in order to emphasize basic relationships or principles of operation.

The apparatus and method of the present invention provide a kinematic mount mechanism for a lens or other optical element that is advantaged over conventional lens mount designs because it is capable of being monolithically constituted, either formed subtractively by forming an arrangement of cavities in a single block of material or formed additively by any of a number of techniques that deposit material in a pattern to form a single part. Alternately, the lens mount of the present invention can also be assembled from multiple components, formed and arranged with the geometry described subsequently.

The apparatus of the present invention is a lens cell that can be formed from a single block of material in such a way that it behaves kinematically as if it were two rigid parts: an inner member that holds a lens or other optical component and an outer member or frame that can be fastened to one or more adjacent lens cells or to some other structure. The inner member is preferably symmetrical about an axis. With the outer member held stationary, the arrangement of constraints allows the inner member three degrees of rotational freedom with respect to this axis. This motion can be achieved without imparting unwanted parasitic motions and without the need to disassemble (and subsequently reassemble) a lens assembly. For the optical systems designer, the particular arrangement of constraints provided by the present invention is advantaged over earlier constraint arrangements because it provides a single pivot point along the optical axis for rotational movement of a lens or other optical component. The relative location of the pivot point can be specified by the designer, allowing considerable flexibility for making positional adjustments.

In order to better understand the operation of the present invention, it is instructive to consider the kinematic relationships shown for a "tire swing", once a common playground apparatus. In a tire swing 10, a tire 12 connects to an eye bolt 14 or other overhead pivot point by three chains 16 of approximately equal length. From a kinematic perspective, each chain 16, by its cooperation with gravity, represents a constraint. In applied kinematics, it is well understood that a body constrained by this particular pattern of three (or more) constraints intersecting at one common point will have three rotational degrees of freedom (DOF) through the fixed common point. Thus, tire 12 of this recreational apparatus has three degrees of freedom (DOF) of rotation. Referring to the coordinate axes shown at the intersection of the three chains 16 (that is, at eyebolt 14) tire 12 can rotate about the y axis ($\theta$y rotation) as represented in dotted lines in FIG. 1. Similarly, rotation about the x axis ($\theta$x rotation) or about both x and y axes ($\theta$x and $\theta$y rotation) is also possible, as is some rotation about the z axis ($\theta$z rotation). When the three chains 16 are pulled taut by gravity, no other degrees of freedom are possible.

The intent of the present invention is to provide a kinematic relationship that is, in basic principle, somewhat analogous to that illustrated by the tire swing example of FIG. 1. Unlike earlier kinematic mount solutions that allow tilt and tip DOF about two axes, the present invention provides movement with respect to a single, common pivot point on the central or optical axis A as shown in the tire swing example. For the present invention, the movable inner element constrains translation along the z axis and allows optical centering adjustments with at least some freedom of $\theta$x, $\theta$y, and $\theta$z rotation. The inner element is used to mount an optical component, such as a lens, mirror, or other element or may itself be an optical component, such as a reflective element.

A folded sheet flexure, more simply termed a fold flexure in the present application, provides a single constraint along the line of its fold. The present invention employs an arrangement of fold flexure constraints, having their folds oriented in such a way that it provides the equivalent arrangement of $\theta$x, $\theta$y, and $\theta$z degrees of freedom described with reference to tire swing 10 in FIG. 1. (Of course, the analogy with the tire swing is imperfect, since gravity is a required component for the tire swing, whereas the linear constraint provided by the fold flexure is stiff in both tension and compression.)

Figure 2:
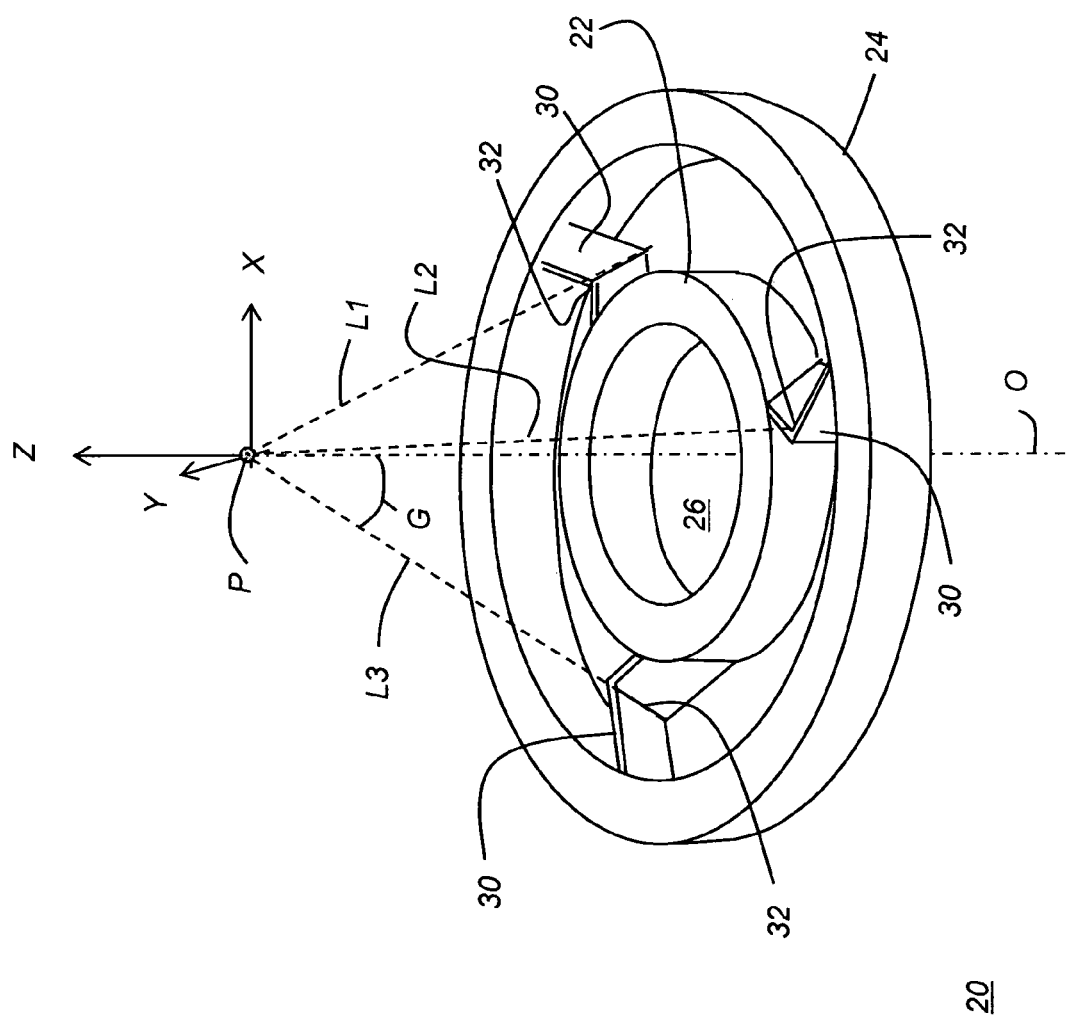
FIG. 2 is a perspective view of a lens mount in one embodiment.

Referring to FIG. 2, there is shown an optical element mount 20 according to one embodiment of the present invention. Optical element mount 20 has an inner member 22 and has an orifice or opening 26 that is used for holding an optical element. Inner member 22 is suspended within an outer member 24 by multiple fold flexures 30. A minimum of three fold flexures 30 is used, as shown in FIG. 2. Each fold 32 is tilted, oriented so that it lies along a corresponding line L1, L2, or L3 that intersects optical axis O at a common point P. Each line L1-L3 is inclined toward, but not parallel to, optical axis O. The basic equivalence of the constraint arrangements of FIGS. 1 and 2 can be seen. Common point P, defined at the intersection of lines L1, L2, and L3, thus serves as a fixed pivot point for rotational movement of inner member 22 about axes orthogonal to the central optical axis O and about optical axis O itself.

In the embodiment shown, common point P is spaced apart from optical element mount 20 components. However, the position of common point P is unbounded. Thus, the apparatus of the present invention gives the optical designer the capability to optimize the relative position of point P along the optical axis O toward which folds 32 of fold flexures 30 are oriented. For example, using optical system analysis techniques known to those skilled in the art, an optical systems designer can identify, for each lens or other optical element that uses optical element mount 20, a corresponding position along optical axis O that is best suited to serve as its pivot point P in a particular case.

Typically, inner member 22 is symmetrical about optical axis O. However, symmetry about this axis is not required. It should be noted that the mathematical definition of a cylinder includes not only the familiar right circular cylinder, but also any number of other shapes whose outer surface can be defined by moving a straight line parallel to a fixed straight line, wherein the moving straight line intersects a fixed planar closed curve or base. Although cylindrical shapes for inner and outer members 22 and 24 are shown in the exemplary embodiments of FIG. 2 and following, either or both of these components could be non-cylindrical in shape.

As can be seen in FIG. 2, folds 32 form V-shaped structures, giving fold flexures 30 a distinctive "slanted chevron" shape in this embodiment. Each fold 32 is at an inclined angle relative to the optical axis O, so that angle G between the extended line of fold 32 and optical axis O is non-zero. Angle G formed by each fold can vary over a range of possible angles, typically ranging from about 30 to about 150 degrees, allowing a great deal of flexibility in mount 20 design.

A number of different chevron orientations is possible, provided that each fold 32 lies on a line that intersects optical axis O at the shared common point P. In the embodiment of FIG. 2, shown in top view in FIG. 3, the chevrons point tangentially with respect to the symmetrical geometry of inner member 22. Arms 34 that connect fold flexure 30 to inner member 22 extend tangentially outward from inner member 22.

Figure 3:
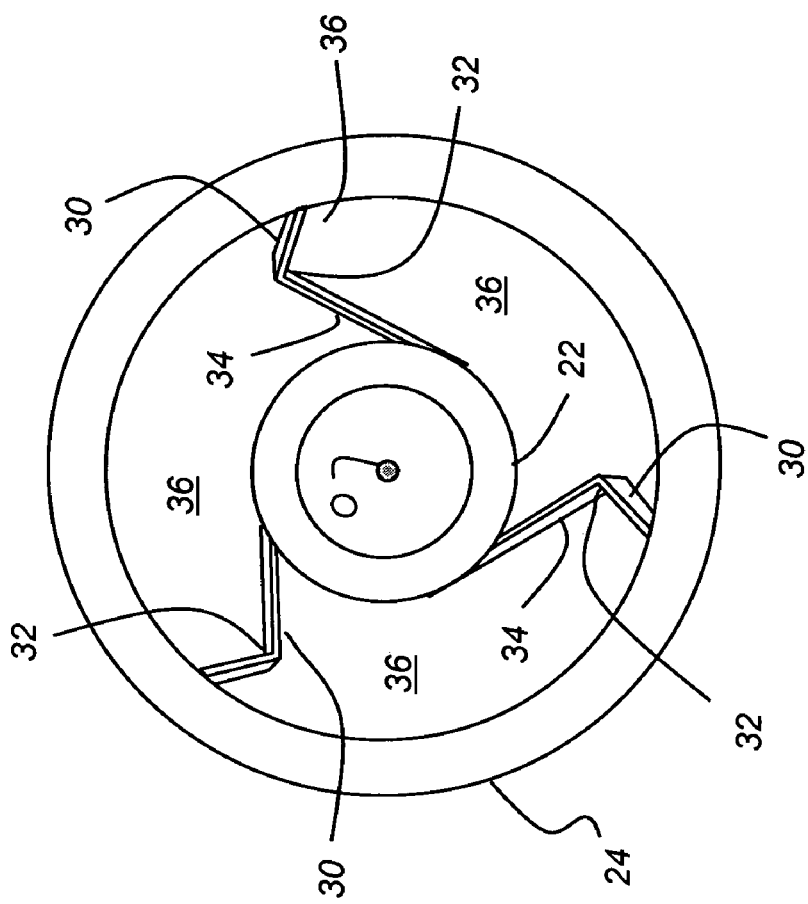
FIG. 3 is a top view of the lens mount of FIG. 2.
Figure 4:
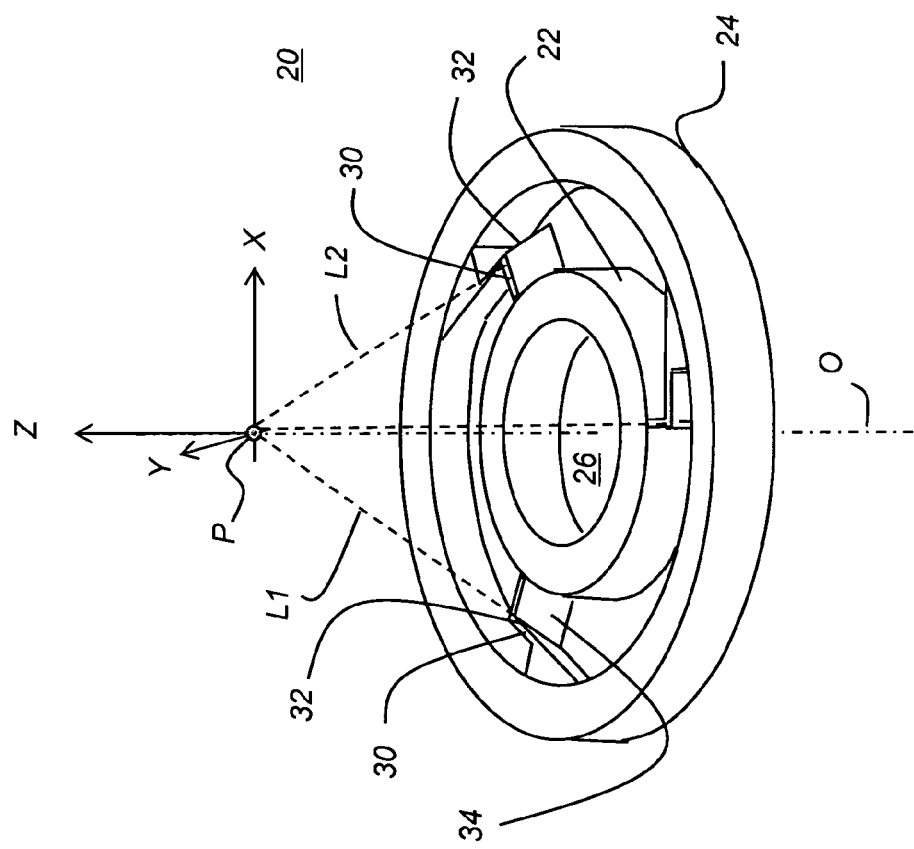
FIG. 4 is a perspective view of a lens mount in an alternate embodiment.

FIG. 4 shows an alternate embodiment, in which the chevrons of fold flexures 30 point tangentially as in FIGS. 2 and 3. However, in the FIG. 4 embodiment, arms 34 extend radially outward from inner member 22. Provided that each fold 32 lies along a line L1-L3 of intersection for common pivot point P, any suitable orientation of the slanted chevron shapes formed by fold flexures 30 can be used. In yet another alternate embodiment (not shown), the chevrons of fold flexures 30 could point radially outward from inner member 22. Variables such as the number of fold flexures 30 and chevron and arm 34 orientation can be specified as needed in an application. Fabrication methods and costs may be practical considerations for arriving at the preferred shape and orientation of fold flexures 30.

Figure 5:
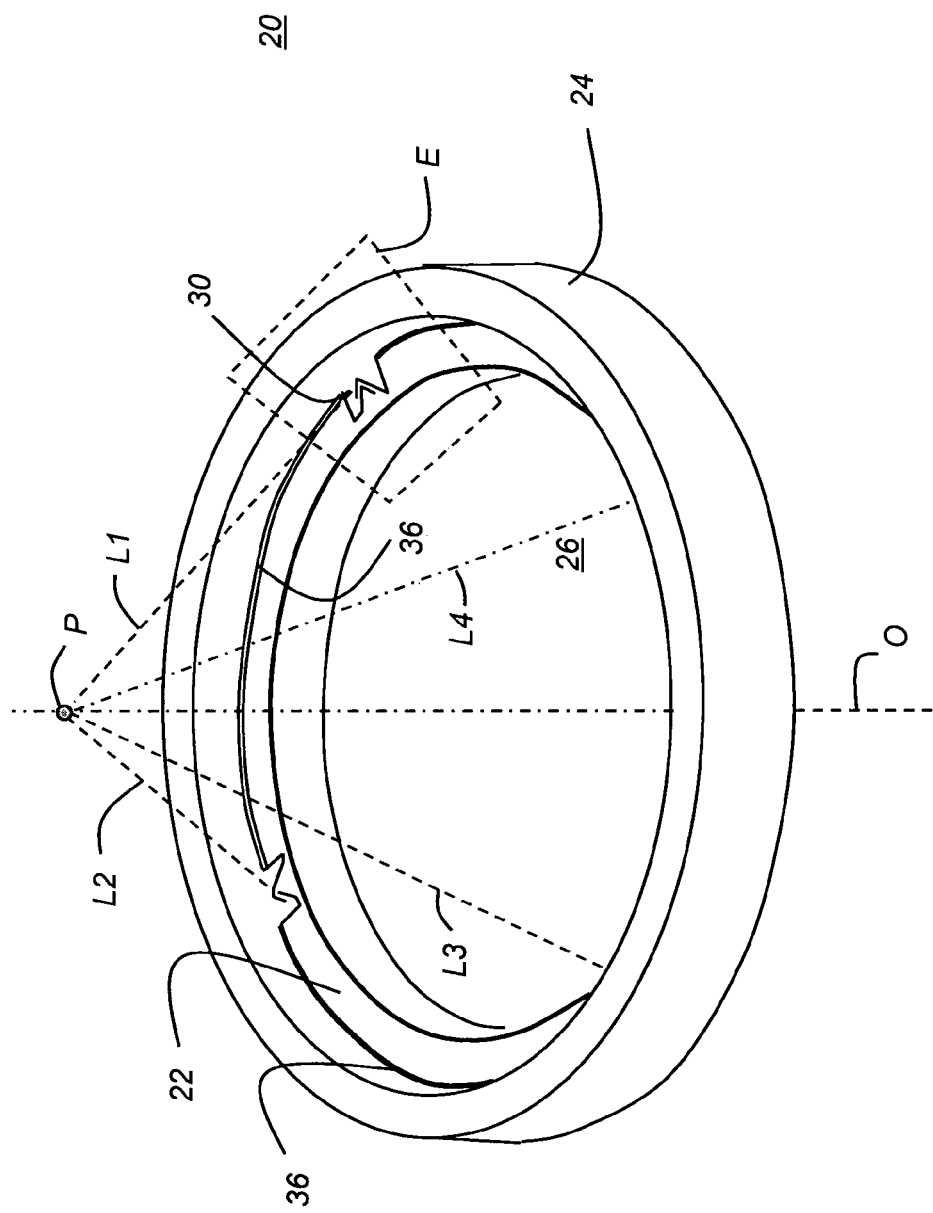
FIG. 5 is a perspective view of a lens mount in another alternate embodiment.

For monolithic fabrication, one cost consideration relates to the amount of material that must be removed from a block or additively deposited in order to fabricate optical element mount 20. Each fold flexure 30 is defined by two adjacent cavities 36, as shown in FIG. 3, so that the shape of cavities 36 can be considered to define the shape of fold flexure 30. The alternate embodiment of optical element mount 20 shown in FIG. 5 uses an arrangement of cavities 36 that are relatively narrow curved slots. For subtractive or machining fabrication techniques, this embodiment requires that less material be removed to define cavities between inner and outer members 22 and 24 than in the embodiments of FIGS. 2-4 described earlier. Here, opening 26 within inner member 22 is also relatively larger with respect to the diameter of outer member 24. Portion E, in dashed outline in FIG. 5, is shown enlarged in FIG. 6A to show the arrangement of one of fold flexures 30 in this configuration. For clarity, FIG. 6B shows, in bold phantom lines, only the center lines of portions of adjacent cavities 36 that define the fold flexure shown in FIG. 6A. Again, in monolithic construction, the slanted chevron pattern is used, as fold flexure 30 is defined by two adjacent cavities 36, with each cavity 36 defining opposite surfaces of the fold flexure 30. Fold 32 lies along inclined intersecting line L1, shown in FIGS. 5 and 6A. This same pattern is used at each fold flexure 30 in the embodiment of FIG. 5. It is instructive to note that the embodiment of FIG. 5 uses four fold flexures 30, spaced 90 degrees apart with respect to a view taken along optical axis O and with folds aligned along lines L1-L4.

As is readily recognizable to those skilled in the optical mounting arts, there are advantages in using three fold flexures 30 that are spaced substantially at 120 degree intervals relative to a view taken along axis O. However, when optical element mount 20 is formed from a single block of material, more than three fold flexures 30 can be used without overconstraint concerns. In practice, it has been found advantageous to use four fold flexures 30 in some designs, with the four fold flexures 30 disposed at 90-degree intervals from a view taken along the axis O, such as is shown in FIG. 5. This relationship allows orthogonal tilt and tip adjustments to be made without introducing unwanted motion.

Unlike earlier lens mount approaches, the present invention provides a single pivot point at common point P for allowing rotational movement of inner member 22. The alignment of each fold 32 at an inclined angle relative to optical axis O and with each fold 32 along a line that intersects optical axis O at a common point P gives optical element mount 20 the advantage of exact constraint for providing rotational θx, θy, and optional θz degrees of freedom, according to the coordinate system used for figures in this specification. Rotation about pivot point P thus provides a controlled amount of adjustability for decentration.

Monolithic Fabrication

Advantageously, the combination of this movable inner element and its reference stationary frame can be constituted monolithically, that is, formed from a single block of material. Single-part or monolithic construction has advantages for eliminating problems such as those caused by thermal coefficient differences and fastener fabrication and assembly. Overall, a single-part machined lens mount assembly would inherently have reduced mechanical stress over other types of lens mounts. A single part allows simpler handling, assembly, and mounting for constructing an optical assembly. A monolithically formed optical mount has built-in alignment.

As noted earlier, the optical element mount of the present invention can be fabricated subtractively by forming an arrangement of cavities in a single block of material. Using machining techniques made possible by Computerized Numerical Control (CNC), highly accurate and repeatable machining can be performed to provide single-part construction. EDM machining (Electrical Discharge Machining) is one specialized form of CNC machining that can be used for precision fabrication of complex parts from metal and other hard materials. Briefly, EDM selectively erodes material from a workpiece of a conductive substance using an electrical discharge across the gap between an electrode and the material to be removed. A dielectric fluid continually flows in the gap area around the electrode and flushes out the removed material. Wire EDM is one form of EDM, using a continuously moving wire as its electrode. Other techniques that may be suitable for fabricating a monolithic component can include conventional machining, laser machining, various etching techniques, water jets, and machining technologies in general that remove material from a solid block, forming and shaping cavities of defined dimensions, controlling their overall contour and depth.

The material used for optical element mount 20 in a monolithic embodiment can be any suitable material for the type of application and fabrication method that is used, including stainless steel, aluminum, or some other stable, machinable metals or, alternately, insulating materials including polymers and ceramics that allow the appropriate degree of flexure. For EDM use, a conductive material is required. Monolithic optical element mount 20 can also be formed in a subtractive fashion using other machining techniques that employ erosion to remove material from a block. Orifice or opening 26 can be formed initially within the block of material, using lower-cost machining methods, for example.

With some materials, optical element mount 20 can be a molded part or can be formed by other methods, including material deposition, for example. Any of a number of rapid-prototyping-techniques could be used to provide a monolithic structure. Some examples of rapid-prototyping technologies that could be employed for fabrication of optical element mount 20 include Selective Laser Sintering (SLC), stereo-olithography, and a host of other techniques that fabricate solid structures by depositing material in an additive fashion.

The arrangement of the present invention is advantaged in a number of ways over conventional solutions for allowing tip and tilt and centration adjustments of optical components. Integral or monolithic construction gives optical element mount 20 a number of inherent advantages for thermal stability and overall rigidity. In an optical assembly having a number of lens elements, more than one optical element mount 20 can be used. Each optical element mount 20 can have the same external dimensional profile, fitting into the stacked annulus pattern described earlier for stepper lenses, yet allow tilt and tip and decentering adjustment for its lens relative to a different pivoting point P. Common point P that is used for any mount in the optical system can be above or below optical element mount 20 along the optical axis.

The optical mount of the present invention can be utilized for a single lens or other optical component or for one or more optical elements in a complex optical assembly, such as the stepper lens used in microlithography as described earlier. While optical element mount 20 can be constituted monolithically, as described for the embodiments shown in FIGS. 2 through 6A, it can also be assembled from multiple parts. Thus, for example, one or more of fold flexures 30 can be fabricated separately and fastened between inner member 22 and outer member 24 using suitable fastener hardware or attachment techniques. It can be appreciated that monolithic fabrication can offer clear advantages by automatically providing the precise angular orientation needed for each fold 32.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while the apparatus of the present invention is well-suited to photolithography applications, this mount apparatus can be used in any of a number of other applications for which only rotation relative to orthogonal coordinate axes is permissible. Opening 26 can be used to mount any of a number of optical elements, including a lens, mirror, prism, optical film, grating, or other device, along with supporting hardware for the device. The inner surface of inner member 22, forming opening 26, can be further machined or otherwise featured to hold the optical element and any needed fasteners. Alternately, inner member 22 may be the optical component itself, without the need for opening 26.

Thus, what is provided is a mount for an optical element that allows tilt and tip movement about axes orthogonal to the optical axis and some rotation about the optical axis, but constrains translational movement along the axis or in a plane orthogonal to the axis.

The invention claimed is:

1. An optical element mount comprising:
   an outer member and an inner member wherein the inner member has a central axis and is suspended within the outer member by a plurality of folded sheet flexures,
   wherein each folded sheet flexure has a fold that lies along a line that is inclined toward the central axis and that intersects the central axis at one common point,
   wherein the common point serves as a pivot point for rotational movement of the inner member.

2. The optical element mount of claim 1 wherein the inner member is substantially symmetric about the central axis.

3. The optical element mount of claim 1 wherein the inner member is substantially cylindrical.

4. The optical element mount of claim 1 wherein the inner member further has an opening symmetric about the central axis.

5. The optical element mount of claim 4 further comprising a lens element mounted within the opening.

6. The optical element mount of claim 1 formed as a monolithic structure.

7. The optical element mount of claim 6 wherein the monolithic structure is of a material taken from the group consisting of aluminum and stainless steel.

8. The optical element mount of claim 1 wherein the common point is spaced apart from the inner member.

9. A monolithic optical element mount comprising:
   an outer member and an inner member formed within the outer member, wherein the inner member has a central axis and is suspended within the outer member by a plurality of folded sheet flexures,
   wherein each folded sheet flexure has a fold that lies along a line that is inclined toward the central axis and that intersects the central axis at one common point,
   wherein the common point serves as a pivot point for rotational movement of the inner member.

10. The monolithic optical element mount of claim 9 wherein the common point is spaced apart from the inner member.

11. The monolithic optical element mount of claim 9 wherein the inner member is substantially symmetric about the central axis.

12. The monolithic optical element mount of claim 9 wherein the inner member is substantially cylindrical.

13. The monolithic optical element mount of claim 9 wherein the inner member further has an opening symmetric about the central axis.

14. The monolithic optical element mount of claim 13 further comprising a lens element mounted within the opening.

15. The monolithic optical element mount of claim 9 formed from a material taken from the group consisting of aluminum and stainless steel.

16. A method for forming an optical element mount comprising:
   a) suspending an inner member within an outer member by extending a plurality of fold flexures therebetween; and
   b) inclining the fold for each of the plurality of fold flexures to lie along a line that intersects a central axis at one common point.

17. The method of claim 16 wherein extending a plurality of fold flexures comprises forming a plurality of cavities between the inner member and the outer member,
   wherein opposite surfaces of each of the fold flexures are defined by two adjacent cavities formed between the inner member and outer member.

18. The method of claim 17 wherein forming the plurality of cavities comprises using electrical discharge machining.

* * * * *